(12) United States Patent
Anderson et al.

(10) Patent No.: US 11,098,953 B2
(45) Date of Patent: Aug. 24, 2021

(54) INTEGRATED FAN HEAT EXCHANGER

(71) Applicant: Carrier Corporation, Farmington, CT (US)

(72) Inventors: Jackie S. Anderson, Canastota, NY (US); Peter R. Bushnell, Cazenovia, NY (US); Ryan K. Dygert, Cicero, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 391 days.

(21) Appl. No.: 15/560,856

(22) PCT Filed: Apr. 5, 2016

(86) PCT No.: PCT/US2016/025974
§ 371 (c)(1),
(2) Date: Sep. 22, 2017

(87) PCT Pub. No.: WO2016/164332
PCT Pub. Date: Oct. 13, 2016

(65) Prior Publication Data
US 2018/0120032 A1    May 3, 2018

Related U.S. Application Data

(60) Provisional application No. 62/145,944, filed on Apr. 10, 2015.

(51) Int. Cl.
*F28D 1/02* (2006.01)
*F28F 1/02* (2006.01)
(Continued)

(52) U.S. Cl.
CPC ............ *F28D 1/024* (2013.01); *F01D 25/12* (2013.01); *F02K 3/105* (2013.01); *F04D 29/542* (2013.01);
(Continued)

(58) Field of Classification Search
CPC ........ F01D 25/12; F02K 3/105; F04D 29/325; F04D 29/542; F04D 29/582;
(Continued)

(56) References Cited

U.S. PATENT DOCUMENTS 3,520,356 A * 7/1970 Bell .................... G21C 15/18
376/298
4,218,179 A * 8/1980 Barry .................... F01D 5/189
415/114
(Continued)

FOREIGN PATENT DOCUMENTS

CN    101600919 A    12/2009
CN    202188569 U    4/2014
(Continued)

OTHER PUBLICATIONS

PCT ISR Written Opinion; International Application No. PCT/US2016/025974; International Filing Date: Apr. 5, 2016, dated Jul. 8, 2016; pp. 1-6.
(Continued)

*Primary Examiner* — Carl C Staubach
(74) *Attorney, Agent, or Firm* — Cantor Colburn LLP (57) ABSTRACT

An integrated fan heat exchanger stator assembly is provided including a hub and a casing. A plurality of elements is arranged between the hub and the casing. The plurality of elements is separated from one another by a plurality of external flow passages. At least one internal flow passage is configured to convey a first heat transfer fluid through one or more of the plurality of elements. The first heat transfer fluid is arranged in thermal communication with a second heat transfer fluid configured to flow through at least one of the external flow passages.

7 Claims, 5 Drawing Sheets

(51) Int. Cl.
*F28F 1/12* (2006.01)
*F28D 1/04* (2006.01)
*F04D 29/58* (2006.01)
*F02K 3/105* (2006.01)
*F01D 25/12* (2006.01)
*F04D 29/54* (2006.01)
*F04D 29/32* (2006.01)

(52) U.S. Cl.
CPC ............ *F04D 29/582* (2013.01); *F28D 1/04* (2013.01); *F28F 1/022* (2013.01); *F28F 1/126* (2013.01); *F04D 29/325* (2013.01); *F05D 2220/36* (2013.01); *F05D 2240/12* (2013.01); *F05D 2260/213* (2013.01); *F28F 2250/08* (2013.01)

(58) Field of Classification Search
CPC ............ F05D 2220/36; F05D 2240/12; F05D 2260/213; F28D 1/024; F28D 1/04; F28F 1/022; F28F 1/126; F28F 2250/08; F28F 1/28
See application file for complete search history.

(56) References Cited

U.S. PATENT DOCUMENTS

| | | | |
|---|---|---|---|
| 4,373,577 A | | 2/1983 | McMillen |
| 4,691,767 A | * | 9/1987 | Tanaka .................... F28F 1/325 165/151 |
| 4,794,285 A | * | 12/1988 | Nimura .................... H02K 5/04 310/62 |
| 5,439,351 A | * | 8/1995 | Artt ........................ F01D 5/185 165/104.26 |
| 5,577,888 A | * | 11/1996 | Capdevila ............. F04D 29/325 415/210.1 |
| 5,895,206 A | | 4/1999 | Chuang et al. |
| 6,695,038 B2 | | 2/2004 | Lopatinsky et al. |
| 7,044,202 B2 | | 5/2006 | Lopatinsky et al. |
| 7,143,820 B2 | | 12/2006 | Crocker et al. |
| 7,324,339 B2 | | 1/2008 | Foster, Sr. et al. |
| 7,509,999 B2 | | 3/2009 | Angelis et al. |
| 7,582,997 B2 | | 9/2009 | Rojo Lulic |
| 7,780,422 B2 | | 8/2010 | Berroth |
| 7,930,897 B2 | | 4/2011 | Eom et al. |
| 8,092,154 B2 | | 1/2012 | Jarrah et al. |
| 8,228,675 B2 | | 7/2012 | Koplow |
| 8,313,282 B1 | | 11/2012 | Jarrah et al. |
| 9,909,448 B2 | * | 3/2018 | Gerstler .................. F01D 9/041 |
| 10,196,932 B2 | * | 2/2019 | Sennoun ............... F01D 25/125 |
| 2002/0148600 A1 | * | 10/2002 | Bosch ....................... F28D 7/04 165/163 |
| 2009/0074594 A1 | | 3/2009 | Strasser |
| 2010/0170657 A1 | | 7/2010 | Kaslusky |
| 2010/0236215 A1 | * | 9/2010 | Venkataramani ....... F01D 9/065 60/39.093 |
| 2011/0073289 A1 | | 3/2011 | Shah |
| 2015/0204615 A1 | * | 7/2015 | Stafford .................... F28F 1/12 165/104.14 |

FOREIGN PATENT DOCUMENTS

| | | |
|---|---|---|
| EP | 0036213 A1 | 9/1981 |
| EP | 1884625 A2 | 2/2008 |
| GB | 965793 A | 8/1964 |
| GB | 1210185 A | 10/1970 |
| RU | 2511840 C2 | 4/2014 |
| RU | 2516998 C2 | 5/2014 |
| WO | 8200342 A1 | 2/1982 |
| WO | 2014109970 A1 | 7/2014 |
| WO | 2015107419 A1 | 7/2015 |

OTHER PUBLICATIONS

PCT; Notification of Transmittal of The International Search Report; International Application No. PCT/US2016/025974; International Filing Date: Apr. 5, 2016, dated Jul. 8, 2016; pp. 1-6.
Chinese Office Action and Search Report for Application No, 201680021259,1; dated Mar. 29, 2019; 14 pages.
Chinese Office Action for Application No. 201680021259.1; dated Sep. 25, 2019; 3 pages.
International Preliminary Report on Patentability for Application No, PCT/US2016/025974; dated Oct. 10, 2017; 7 pages.
Russian Office Action for Application No. 2017138129/06; dated Jul. 5, 2019; 7 pages.

* cited by examiner

INTEGRATED FAN HEAT EXCHANGER

CROSS REFERENCE TO RELATED APPLICATIONS

This application is a National Stage application of PCT/US2016/025974, filed Apr. 5, 2016, which claims the benefit of U.S. Provisional Patent Application No. 62/145,944, filed Apr. 10, 2015, both of which are incorporated by reference in their entirety herein.

BACKGROUND

The subject matter disclosed herein relates to the management of thermal energy and, more particularly, to heat exchange equipment.

The management of thermal energy can be important in many applications, such as including electronics (e.g., microprocessor cooling), climate control, power generation, and power dissipation. The efficiency, size, and/or capacity, of various systems and equipment can depend on the effectiveness of their thermal energy management. For example, the cooling capacity of air conditioning equipment can depend on the effectiveness of a condenser which transfers thermal energy from a refrigerant stream to an air stream.

SUMMARY

According to one embodiment, an integrated fan heat exchanger stator assembly is provided including a hub and a casing. A plurality of elements is arranged between the hub and the casing. The plurality of elements is separated from one another by a plurality of external flow passages. At least one internal flow passage is configured to convey a first heat transfer fluid through one or more of the plurality of elements. The first heat transfer fluid is arranged in thermal communication with a second heat transfer fluid configured to flow through at least one of the external flow passages.

In addition to one or more of the features described above, or as an alternative, in further embodiments the plurality of elements includes at least one guide vane extending radially between the hub and the casing.

In addition to one or more of the features described above, or as an alternative, in further embodiments the at least one guide vane is configured to straighten a flow of the second heat transfer fluid.

In addition to one or more of the features described above, or as an alternative, in further embodiments the at least one guide vane is configured to preswirl a flow of the second heat transfer fluid.

In addition to one or more of the features described above, or as an alternative, in further embodiments the plurality of elements is formed with at least one of circumferential sweep and axial sweep.

In addition to one or more of the features described above, or as an alternative, in further embodiments the plurality of elements includes at least one element extending circumferentially between the hub and the casing.

In addition to one or more of the features described above, or as an alternative, in further embodiments wherein at least one of the plurality of elements includes multiple elements extending between a leading edge and a trailing edge of the hub and casing.

In addition to one or more of the features described above, or as an alternative, in further embodiments a plurality of fins is arranged in fluid communication with at least a portion of the plurality of elements.

In addition to one or more of the features described above, or as an alternative, in further embodiments the plurality of the fins are configured to straighten or preswirl the flow.

According to yet another embodiment, a fan assembly is provided including a fan rotor having a plurality of fan blades. The fan rotor is rotatable about an axis to generate a flow of a first heat transfer fluid. A stator assembly includes a hub, casing, and a plurality of elements arranged between the hub and the casing. The plurality of elements is separated by a plurality of external flow passages. At least one internal flow passage is configured to convey a second heat transfer fluid through one or more of the plurality of elements. The second heat transfer fluid is arranged in thermal communication with the first heat transfer fluid configured to flow through at least one of the plurality of external flow passages.

In addition to one or more of the features described above, or as an alternative, in further embodiments the fan rotor is an axial flow rotor.

In addition to one or more of the features described above, or as an alternative, in further embodiments the fan rotor is a mixed flow rotor.

In addition to one or more of the features described above, or as an alternative, in further embodiments at least a portion of the plurality of elements is positioned downstream from the fan rotor with respect to a direction of flow of the first heat transfer fluid through the fan assembly.

In addition to one or more of the features described above, or as an alternative, in further embodiments at least a portion of the plurality of elements is positioned upstream from the fan rotor with respect to a direction of flow of the first heat transfer fluid through the fan assembly.

In addition to one or more of the features described above, or as an alternative, in further embodiments the plurality of elements includes at least one guide vane extending radially between the hub and the casing.

In addition to one or more of the features described above, or as an alternative, in further embodiments the at least one guide vane is formed with at least one of circumferential sweep and axial sweep.

In addition to one or more of the features described above, or as an alternative, in further embodiments the plurality of elements includes at least one element extending circumferentially between the hub and the casing.

In addition to one or more of the features described above, or as an alternative, in further embodiments each of the plurality of elements includes multiple elements extending between a leading edge and a trailing edge of the hub and casing.

In addition to one or more of the features described above, or as an alternative, in further embodiments a plurality of fins extends from at least a portion of the plurality of elements.

In addition to one or more of the features described above, or as an alternative, in further embodiments a separate heat exchanger is arranged adjacent the fan system such that the flow of the first heat transfer fluid generated by the fan rotor additionally creates a corresponding flow of the first heat transfer fluid through the heat exchanger.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of, together with advantages and features, by way of example with reference to the drawings.

DETAILED DESCRIPTION

Heat exchangers can be constructed having a variety of configurations, such as using microchannel or round tube arrangements with extended fins for example. With such heat exchanger, heat can be transferred to or from a fluid flowing through a plurality of tubes positioned between headers for fluid communication. Heat exchanger designs include crossflow and counter flow designs with various fin configurations such as louvered, offset or wavy fins. These standalone heat exchangers are designed with large face areas, and yield air flow having a low velocity through the heat exchanger. This combination of large face area and low velocity is needed to manage air side pressure loss and associated fan power needed to drive the flow.

Accordingly, it is desired to provide an improved fan and heat exchanger combination that integrates the two components to utilize high through-flow velocities and produce a compact fan-heat exchanger system.

Figure 1:
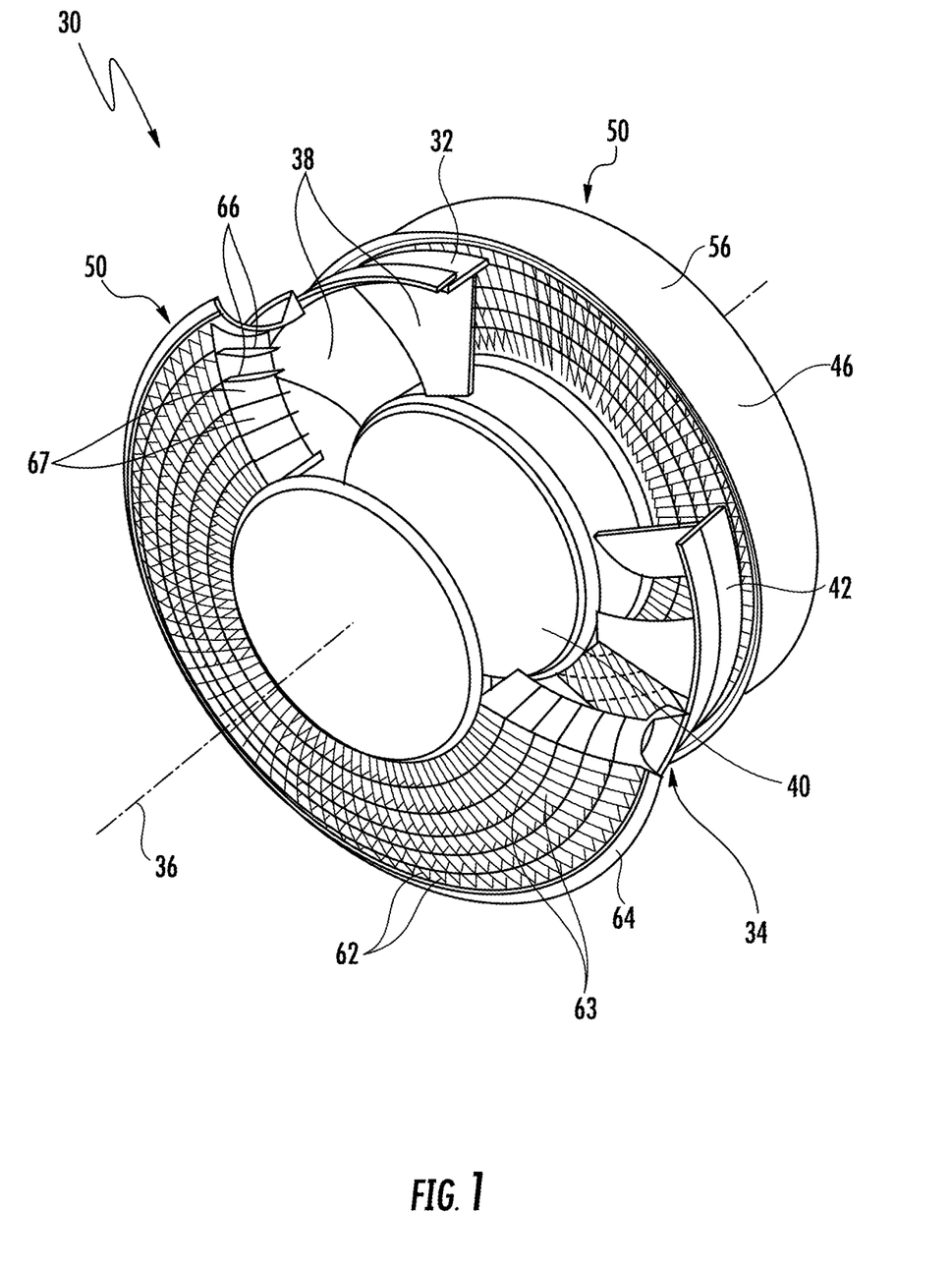
FIG. 1 is a partial cut away, perspective view of a fan assembly.
Figure 2:
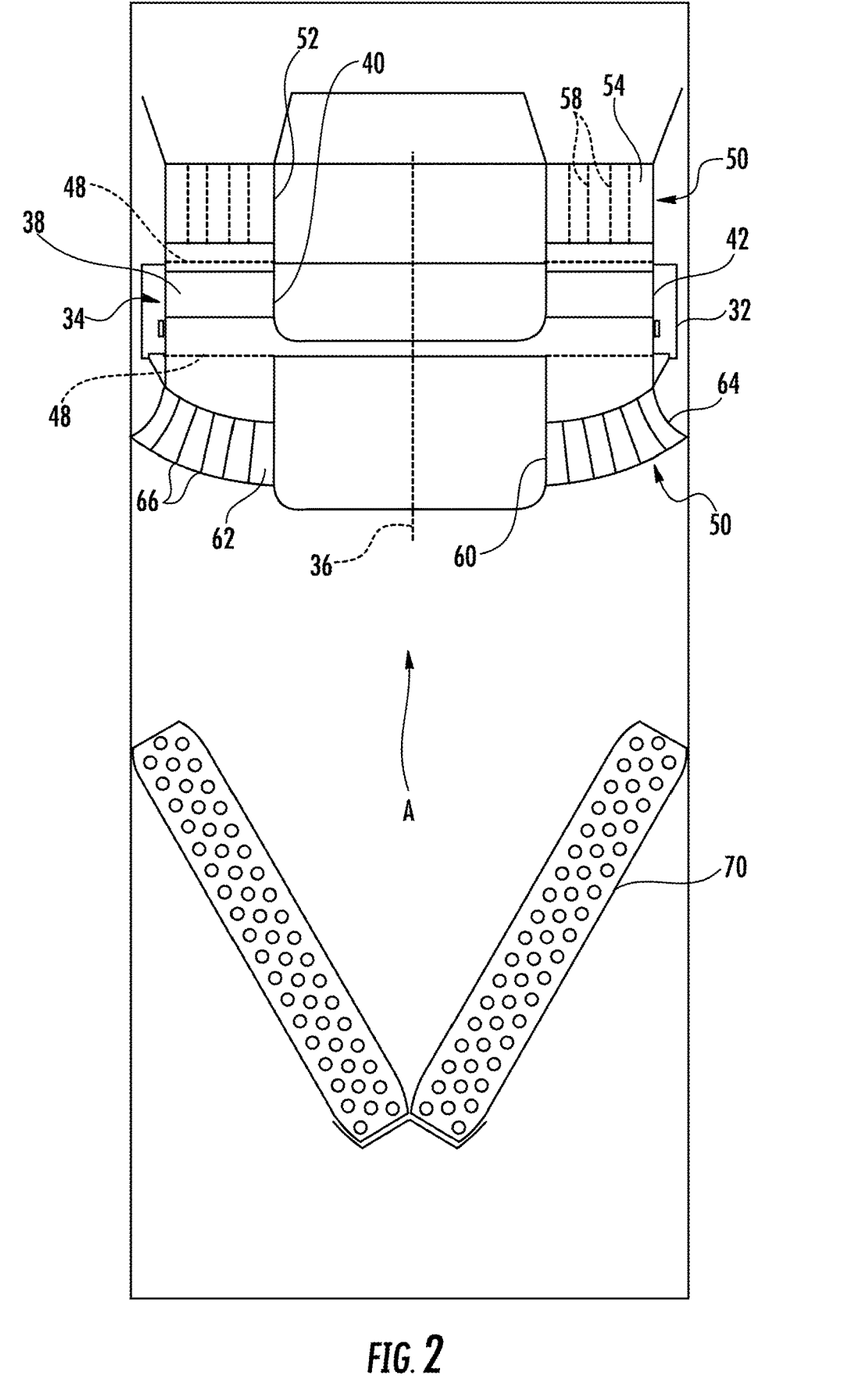
FIG. 2 is a cross-sectional view of a fan and heat exchanger assembly.

Referring now to FIGS. 1-2, an example of a fan assembly 30 is illustrated in more detail. The fan assembly 30 includes a casing 32 with a fan rotor or impeller 34 rotably located within the casing 32. The fan rotor 34 includes a plurality of fan blades 38 extending from a hub 40 and terminating at a fan shroud 42. The fan shroud 42 is connected to one or more of the plurality of fan blades 38. An electric motor (not shown), connected to the fan assembly 30 via a shaft or another coupling means, such as a belt for example, may be used to operate the fan assembly 30 by rotating the fan rotor 34 about a fan axis 36. In an embodiment, the fan assembly 30 is a vane axial fan as described in detail in PCT publication WO2014109970, incorporated herein by reference. However, other fan assemblies 30, such as a mixed flow fan, for example, are within the scope of the present disclosure.

The fan assembly 30 includes at least one stator assembly 50, for example connected to the casing 32 adjacent the discharge end 46 of the fan assembly 30. In such embodiments, the stator assembly 50 is configured as an outlet stator assembly. In the non-limiting embodiment illustrated in FIG. 3a, the stator assembly 50 includes a hub 52 and a plurality of elements 54, such as fins or outlet guide vanes for example, extending radially outward from the hub 52. The plurality of radial elements 54 are separated from one another by a distance to define a plurality of external flow passages 55 (see FIG. 3b). Although the elements 54 are illustrated as having a substantially planar configuration in FIGS. 3a-3c, it should be understood that the elements 54 may be formed with any configuration, for example configurations including lean or sweep in the circumferential or axial directions. The distal ends of the one or more of the elements 54 may, but need not be connected to a stator casing 56. As the fan blades 38 rotate, the airflow A moving toward the radial elements 54 generally has an axial component and a tangential component. The radial elements 54 can be configured to straighten the flow exiting from the fan rotor 34, transforming swirl kinetic energy in the airflow into static pressure rises across the outlet guide vanes 54.

Figure 3A:
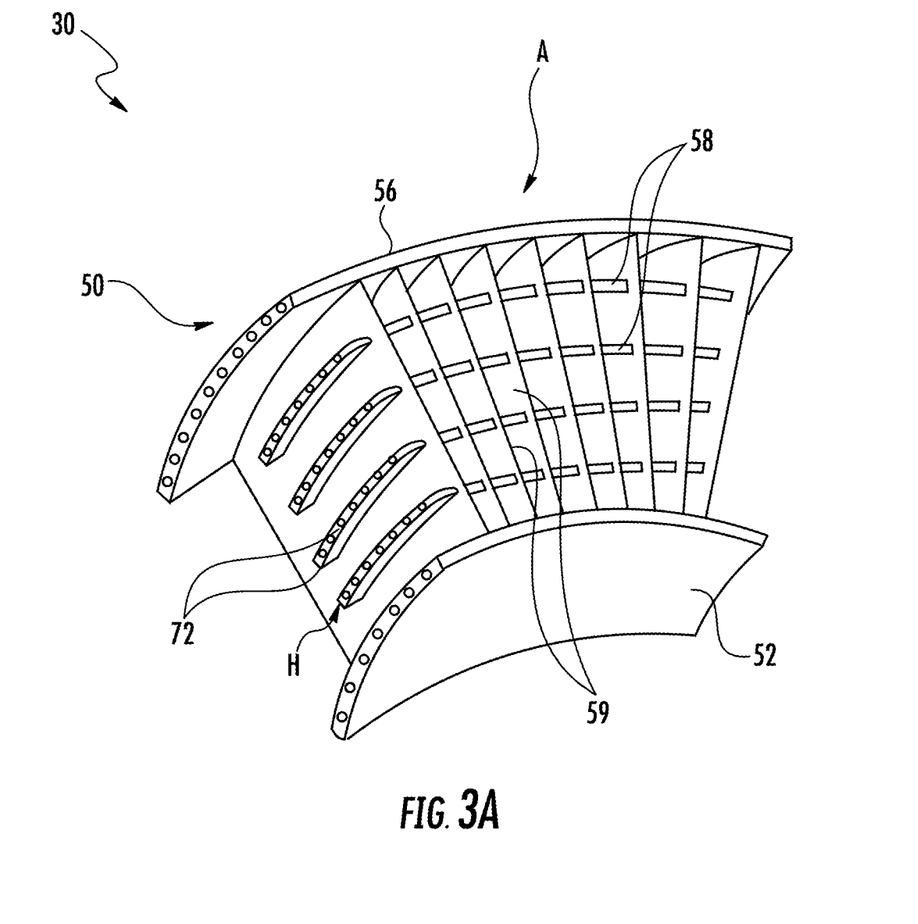
FIGS. 3A-3C are various partially sectioned, perspective views of a fan stator having integral heat exchange flow passages.

In an embodiment, as shown in FIGS. 1 and 3A, alternatively, or in addition to the plurality of radial elements 54, the stator assembly 50 includes one or more elements 58 extending circumferentially around the periphery of the hub 52. For example, the stator assembly 50 may include a single circumferential element 58 extending between the hub 52 and the casing 56 in a spiral configuration such that a distance between the hub 52 and the circumferential element 58 increases about the periphery of the hub 52. In another embodiment, the stator assembly 50 includes a plurality of circumferential elements 58 arranged concentrically about the hub 52 and spaced apart from one another to define a plurality of external flow passages 59 there between. When the stator assembly 50 includes both radial and circumferential elements 54, 58, the circumferential elements 58 generally extend through at least a portion of the plurality of radial elements 54.

Alternatively, or in addition, the stator assembly 50 may be configured as an inlet stator assembly arranged adjacent an inlet end 48 of the fan assembly 30. When configured as an inlet stator assembly 50 (see FIGS. 1 and 2), the assembly 50 includes a hub 60 having a plurality of elements 62, such as inlet guide vanes for example, separated from one another such that a plurality of external flow passages 63 are defined between the elements 62. One or more of the plurality of elements 62 may terminate at a casing 64. The inlet guide vanes 62 may be configured to direct the flow of incoming air A in a desired direction through the fan assembly 30, such as by generating a preswirl for example.

With respect to FIG. 1, the stator assembly 50 may additionally include one or more elements 66 extending circumferentially around the periphery of the hub 52 and separated from one another by a plurality of external flow passages 67. The circumferential elements 66 may extend through at least a portion of the plurality of radial elements 62. As previously suggested, each of the elements 62 or 66 may be formed as a single element or a plurality of segmented or multi-vane elements extending between a leading edge and a trailing edge of the hub 60 and casing 64.

Referring again to FIGS. 1-2, the functionality of a heat exchanger is integrated into a portion of the fan assembly 30, such as the stator assembly 50 for example. The fan assembly 30 includes one or more flow passages 70, 72 configured to transport a heat transfer fluid, such as a liquid, gas, or two phase mixture of refrigerant, between the hub 52, 60 and casing 56, 64 of a stator assembly 50. The flow passages 70 for the heat transfer fluid may be configured to flow radially, such as between the hub 52, 60 and the casing 56, 64 connecting some of the radial elements 54, 62 respectively. In another embodiment, the heat transfer fluid may be configured to flow circumferentially, such as through at least one flow passage 72 formed in the circumferential elements 58, 66 extending around the periphery of the hubs 52, 60 of the stator assembly 50 for example.

A plurality of fins 71 may extend from a surface of either the radial elements 54 or the circumferential elements 58 to enhance heat transfer of the fluid disposed therein. In addition, when a radial element 54 does not include any flow passages 70 formed therein, that element 54 may be configured to function as a fin and improve heat dissipation of the fluid flowing through the flow passages 72 of a circumferential element 58. Similarly, a circumferential element 58 having no flow passages 72 formed therein may be configured to function as a fin and improve heat dissipation of the fluid flowing through the flow passages 70 of a radial element 54.

Figure 3B:
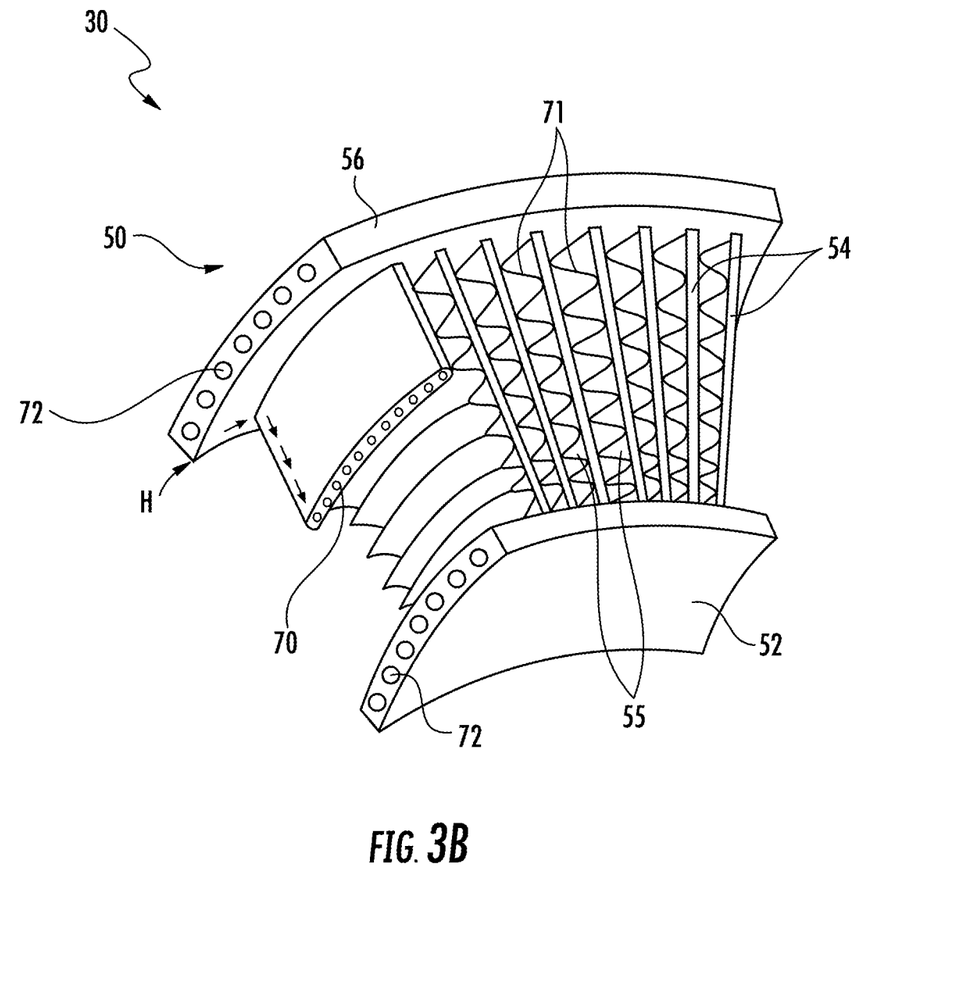
Figure 3C:
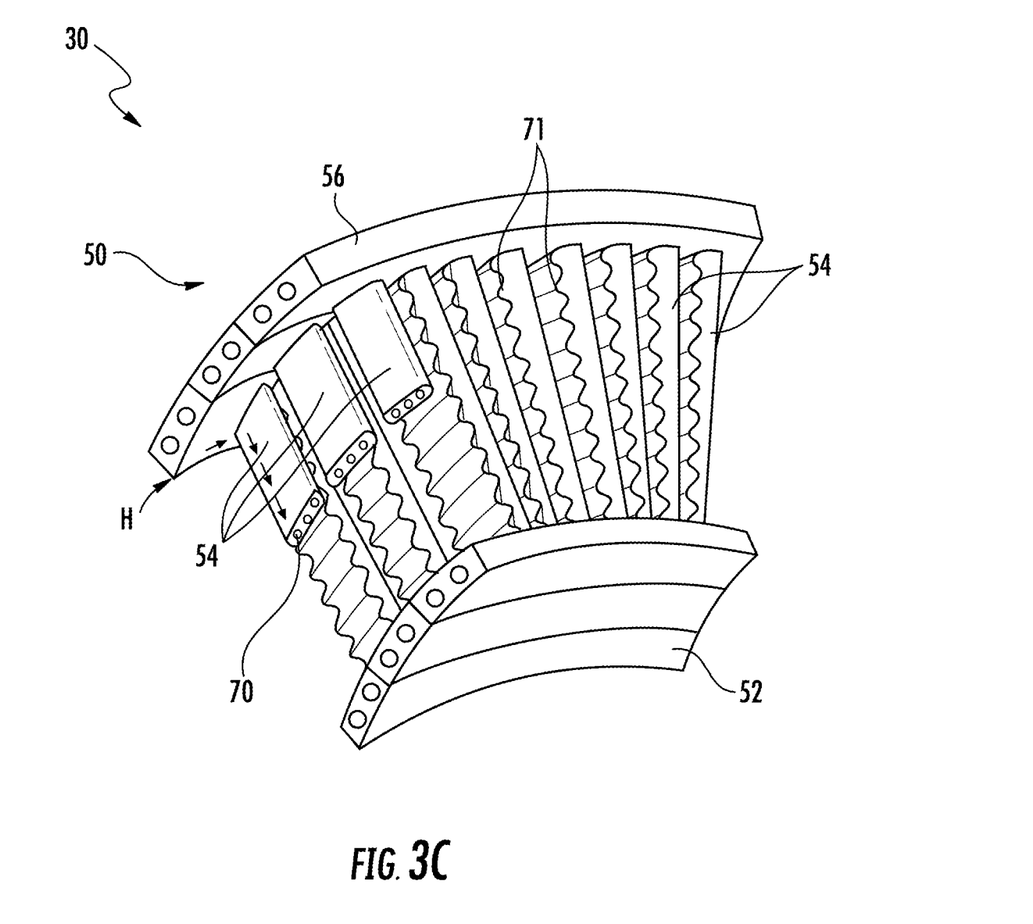

Referring now to FIGS. 3A-3C, a section of the integrated fan heat exchanger stator assembly 50 is shown in more detail. As shown in the embodiment of FIG. 3A, the heat transfer fluid may be configured to flow circumferentially such as through flow passages 72 formed in the circumferential elements 58, around the periphery of the hub 52 of the stator assembly 50. Alternatively, or in addition, the heat transfer fluid may be configured to flow radially, such as between the hub 52 and the shroud 56 through flow passages 70 formed in the radial elements or vanes 54, as shown in FIG. 3B. Alternatively, or in addition, the heat transfer fluid may flow radially, such as through segmented or multi-element vanes 54 for example, as shown in FIG. 3C. Although a radial element 54 is illustrated as being formed from a plurality of segmented or multi-vane elements, one or more of the plurality of circumferential elements 58 may also be formed as a single element or multiple elements extending between a leading edge and a trailing edge of the hub 52 and casing 56.

Depending on the desired system characteristics, the fan assembly 30 may be oriented to have either a "draw through" configuration or a "blow through" configuration with respect to the location of the flow passages 70 and the direction of the airflow A through the fan assembly 30. Rotation of the fan rotor 24 by the motor draws or blows air through the fan assembly 30, including the stator assembly 50. As the air A moves through the fan assembly 30, particularly through the external flow passages 55, 59, 63, 67 formed between adjacent elements of the stator assembly 150, the air A is arranged in a heat transfer relationship with the heat transfer fluid flowing through at least one of the inlet guide vanes 62, the outlet guide vanes 54, or the circumferential elements 58, 66 of the stator assembly 50.

The use of high through-flow velocity and integrated stator assembly 50 heat exchanger combination produces a compact fan-heat exchanger system. As a result, in embodiments where the fan assembly 30 is used in a heating ventilation, air conditioning, and refrigeration (HVAC&R) system for example, the need for a separate heat exchanger 28 may be eliminated and the overall size of the HVAC&R system may be significantly reduced. Referring again to FIG. 2, a separate heat exchanger 70 may be arranged within the flow path of the air A either entering or exiting the fan assembly 30 to augment the system capacity. The separate heat exchanger 70 may include a single coil or a plurality of coils, such as oriented in any configuration. Although the fan assembly 30 having the functionality of a heat exchanger integrated therein is described generally with reference to a portion of an HVAC&R system, the integrated heat exchanger and fan assembly 30 may be used in any application where heat transfer between air and another moving fluid occurs.

In addition, the noise of the fan assembly 30, and therefore the HVAC&R system 20, may be reduced by using the inlet guide vanes 62 as a flow conditioning device.

Embodiment 1

An integrated fan heat exchanger stator assembly comprising: a hub and casing; a plurality of elements arranged between the hub and casing, the plurality of elements being separated from one another by a plurality of external flow passages; and at least one internal flow passage configured to convey a first heat transfer fluid through one or more of the plurality of elements, wherein the first heat transfer fluid is in thermal communication with a second heat transfer fluid configured to flow through at least one of the plurality of external flow passages.

Embodiment 2

The stator of embodiment 1, wherein the plurality of elements includes at least one guide vane extending radially between the hub and the casing.

Embodiment 3

The stator assembly according to embodiment 2, wherein the at least one guide vane is configured to straighten a flow of the second heat transfer fluid.

Embodiment 4

The stator assembly according to embodiment 2, wherein the at least one guide vane is configured to preswirl a flow of the second heat transfer fluid.

Embodiment 5

The stator assembly according to any of the preceding embodiments, wherein the plurality of elements is formed with at least one of circumferential sweep and axial sweep.

Embodiment 6

The stator assembly according to any of the preceding embodiments, wherein the plurality of elements includes at least one element extending circumferentially between the hub and the casing.

Embodiment 7

The stator assembly according to any of the preceding embodiments, wherein at least one of the plurality of elements includes multiple elements extending between a leading edge and a trailing edge of the hub and casing.

Embodiment 8

The stator assembly according to any of the preceding embodiments, wherein a plurality of fins are in thermal communication with at least a portion of the plurality of elements.

Embodiment 9

The stator assembly according to any of the preceding embodiments, wherein the plurality of the fins are configured to straighten or preswirl the flow.

Embodiment 10

A fan assembly comprising: a fan rotor having a plurality of fan blades, the fan rotor being rotatable about an axis to generate a flow of a first heat transfer fluid; and a stator assembly including: a hub; a casing; a plurality of elements arranged between the hub and the casing, the plurality of elements being separated by a plurality of external flow passages; and at least one internal flow passage configured to convey a second heat transfer fluid through one or more of the plurality of elements, wherein the second heat transfer fluid is arranged in thermal communication with the first heat transfer fluid configured to flow through at least one of the plurality of external flow passages.

Embodiment 11

The fan assembly according to embodiment 10, wherein the fan rotor is an axial flow rotor.

Embodiment 12

The fan assembly according to embodiment 11, wherein the fan rotor is a mixed flow rotor.

Embodiment 13

The fan assembly according to any of embodiments 10-12, wherein at least a portion of the plurality of elements is positioned downstream from the fan rotor with respect to a direction of flow of the first heat transfer fluid through the fan assembly.

Embodiment 14

The fan system according to any of embodiments 10-13, wherein at least a portion of the plurality of elements is positioned upstream from the fan rotor with respect to a direction of flow of the first heat transfer fluid through the fan assembly.

Embodiment 15

The fan assembly according to any of embodiments 10-14, wherein the plurality of elements includes at least one guide vane extending radially between the hub and the casing.

Embodiment 16

The fan assembly according to embodiment 15, wherein the at least one guide vane is formed with at least one of circumferential sweep and axial sweep.

Embodiment 17

The fan assembly according to any of embodiments 10-16, wherein the plurality of elements includes at least one element extending circumferentially between the hub and the casing.

Embodiment 18

The fan assembly according to any of embodiments 10-17, wherein each of the plurality of elements includes multiple elements extending between a leading edge and a trailing edge of the hub and casing.

Embodiment 19

The fan assembly according to any of embodiments 10-18, wherein a plurality of fins extends from at least a portion of the plurality of elements.

Embodiment 20

The fan assembly according to any of embodiments 10-19, wherein a separate heat exchanger is arranged adjacent the fan system such that the flow of the first heat transfer fluid generated by the fan rotor additionally creates a corresponding flow of the first heat transfer fluid through the heat exchanger.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and/or scope of the invention. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A fan assembly comprising:
   a fan rotor having a plurality of fan blades, the fan rotor being rotatable about an axis to generate a flow of a first heat transfer fluid; and
   a stator assembly arranged directly upstream from the fan rotor relative to a direction of air flow through the fan rotor, the stator assembly including:
      a hub;
      a casing;
      a plurality of elements arranged between the hub and the casing, the plurality of elements being separated by a plurality of external flow passages, the plurality of elements including at least one guide vane extending radially between the hub and the casing, and at least one circumferential element extending about a circumference of the hub and positioned between the hub and the casing; and
      at least one internal flow passage configured to convey a second heat transfer fluid through one or more of the plurality of circumferential elements, wherein the second heat transfer fluid is arranged in thermal communication with the first heat transfer fluid configured to flow through at least one of the plurality of external flow passages;
      wherein the at least one guide vane is configured to preswirl a flow of the first heat transfer fluid.

2. The fan assembly according to claim 1, wherein the fan rotor is an axial flow rotor.

3. The fan assembly according to claim 2, wherein the fan rotor is a mixed flow rotor.

4. The fan assembly according to claim 1, wherein the at least one guide vane is formed with at least one of circumferential sweep and axial sweep.

5. The fan assembly according to claim 1, wherein each of the plurality of elements includes multiple elements extending between a leading edge and a trailing edge of the hub and casing.

6. The fan assembly according to claim 1, wherein a plurality of fins extends from at least a portion of the plurality of elements.

7. The fan assembly according to claim 1, wherein a separate heat exchanger is arranged adjacent the fan system such that the flow of the first heat transfer fluid generated by the fan rotor additionally creates a corresponding flow of the first heat transfer fluid through the heat exchanger.

* * * * *